United States Patent Office 3,090,747
Patented May 21, 1963

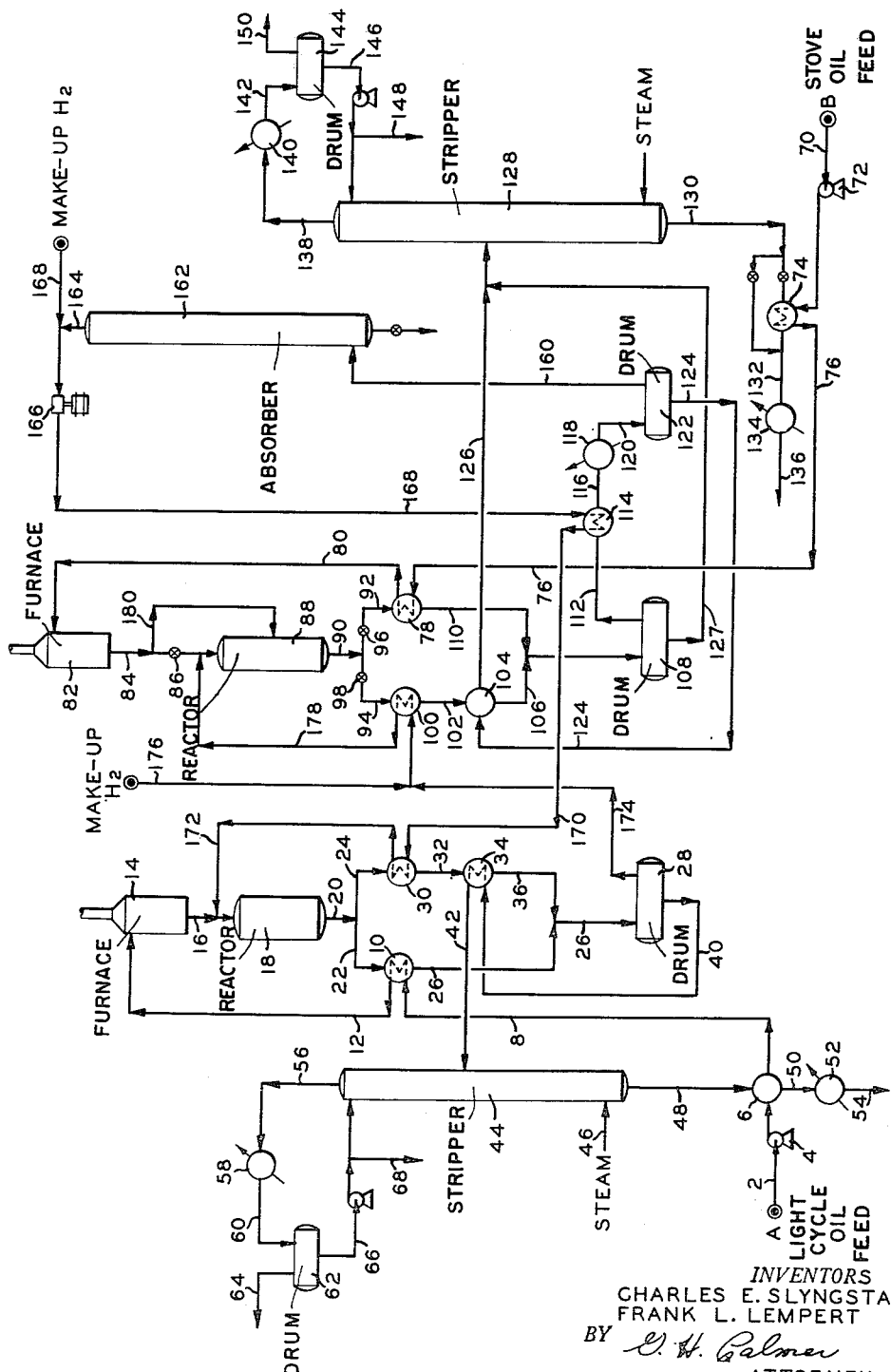

3,090,747
PROCESS FOR DESULFURIZATION OF
DISSIMILAR HYDROCARBONS
Charles E. Slyngstad and Frank L. Lempert, Rutherford,
N.J., assignors to The M. W. Kellogg Company, Jersey City, N.J., a corporation of Delaware
Filed June 8, 1959, Ser. No. 818,853
4 Claims. (Cl. 208—210)

This invention relates to an improved method for treating hydrocarbons with a hydrogen-rich gas stream. In one aspect the invention is directed to an improved arrangement of process steps for the hydrogenation of similar or dissimilar hydrocarbon feed materials. In another aspect the invention is directed to maximizing the efficient utilization of all available hydrogen-rich gas and the use of minimum process steps for the recovery of desired products.

The art of hydrogenating hydrocarbons, and particularly those processes involving hydrofining or catalytically desulfurizing a sulfur-bearing oil in the presence of hydrogen at elevated temperatures up to about 1000° F., and at pressures up to about 200 atmospheres is known. Furthermore, a wide range of catalyst compositions have been proposed for effecting such hydrogenating reactions including oxides and sulfides of for example, aluminium, iron, nickel, cobalt, chromium, molybdenum, copper, manganese, tungsten and compounds such as molybdates, thiomolybdates, tungstates and aluminates of metals of the 6th group, either alone or in combination with other catalysts. The investment and operating costs of such processes vary considerably and are dependent in large part upon the cost of the hydrogen available to the process, its efficient utilization, as well as the process equipment essential for the separation of undesired from desired product constituents of the process. Accordingly, the need for more efficient methods for desulfurizing sulfur-containing hydrocarbons whereby small amounts of hydrogen are employed becomes increasingly acute in view of increased operating costs, as well as the increased necessity to treat sulfur-bearing hydrocarbons.

Accordingly, applicants have found that appreciable economies may be realized and a more versatile process provided by practicing the process in accordance with this invention.

It is an object of this invention to provide an improved arrangement of process steps for hydrofining similar or dissimilar hydrocarbon feed materials.

Another object of this invention is to minimize the hydrogen inventory of the process and optimize the efficient utilization of hydrogen available to the process.

Another object of this invention is to minimize the process equipment necessary to effect the improved process of this invention.

Other objects and advantages of this invention will become apparent from the following description.

This invention is directed in one aspect to an arrangement of process steps employing at least two separate reactors connected for parallel flow of hydrocarbon feed material and series flow of hydrogen-rich gas therethrough while continuously recycling a constant volume of hydrogen-rich gas to the first reactor of the series, with the addition of sufficient make-up hydrogen to each reactor in the series to maintain the hydrogen partial pressure at the reactor outlet of at least about 250 p.s.i.a.

The process of this invention is adaptable to a wide variety of processes including reforming, hydroforming, isomerization, hydrocracking, hydrofining, desulfurization, etc. It is specifically directed to hydrogenating processes such as hydrofining or desulfurization processes where there is a net consumption of hydrogen as distinguished from processes of net hydrogen production. Generally for these kind of processes, it is desired to maintain a relatively high ratio of hydrogen to hydrocarbon, and since the cost of manufacturing hydrogen is high, the incentive to improve the process in the direction of efficient desulfurization by using lower ratios of hydrogen to hydrocarbon is of primary importance. However, providing a process of optimum versatility for processing similar or dissimilar hydrocarbon feeds containing sulfur under efficient desulfurizing conditions and without increasing the hydrogen inventory of the process has also become a prime objective.

In one embodiment, this invention is directed to a hydrofining process employing a plurality of reactors in which one or more of the reactors contains a plurality of separate fixed catalyst beds through which the hydrogen-rich gas is passed in series and to which a hydrocarbon feed material to be desulfurized may be introduced for flow through the total mass of catalyst in each reactor, or any selected portion of the beds of catalyst in the reactors while flowing the hydrogen-rich gas through the total mass of catalyst in each reactor. Accordingly, one of the reactors may contain a single catalyst bed while another of the reactors may contain a plurality of separate catalyst beds therein, or each reactor may contain a plurality of separate catalyst beds therein. By the improved method and sequence of treating steps of this invention, a maximum degree of flexibility for hydrogenating similar or dissimilar hydrocarbon feed materials is provided in order to obtain the desired degree of severity of treatment for a particular feed material being processed. In addition, each reactor is provided with its own fractionator system in order that the process may be employed to process two separate and distinct feed materials simultaneously or a single feed may be charged which will double the capacity of a single reactor process.

In another embodiment, this invention is directed to maximizing the efficient utilization of hydrogen-rich gases available to the process. Accordingly, by the improved process of this invention the volume of hydrogen-rich recycle gas is minimized to that substantially essential for a single reactor system and adapted to a system or process flow arrangement employing at least two separate and distinct reactors. That is, since the recycle gas flows through the reactors in series with the second reactor being maintained at a slightly lower pressure than the first reactor of the series, the increased pressure differential due to the system of the second reactor over a single reactor system is minimized, thereby substantially reducing the duty, as well as the cost of the recycle gas compressor. In addition, since the process is operated at an elevated pressure of from about 700 to about 1200 p.s.i.g., the overall compressor requirements are quite low and, therefore, the necessary incremental horsepower requirement for overcoming the pressure drop of the second reactor over a single reactor system is also quite small. This overall reduction in compressor requirements over prior art systems effects not only a considerable reduction in investment costs, but most important, considerably reduces utilities consumption costs. This, of course, is also of extreme importance to the refiner today in the highly competitive business of petroleum refining.

The improved process of this invention provides an arrangement of steps which may be adapted for the treatment of hydrocarbon feed materials with hydrogen under a wide variety of process conditions including space velocity, temperature, pressure and ratio of hydrogen to hydrocarbon feed material. That is, reaction temperatures may be employed in the range of from about 600° F., to about 900° F.; pressures in the range of from about 400° p.s.i.g. to about 1200 p.s.i.g.; space velocities in the range of from about 0.5 to about 10.0; and ratios of total hydrogen circulated to hydrocarbon feed in the range of from about 0.5 to about 10.0 moles of hydrogen per mole of hydrocarbon. Therefore, maintaining a constant volume of hydrogen-rich recycle gas in the process and adding only sufficient hydrogen to each reactor in a quantity corresponding to that consumed for the treatment of the particular hydrocarbon feed material introduced thereto not only permits the employment of a wide variety of operating conditions, but minimizes the quantities of hydrogen required in the process and promotes more efficient utilization in the process.

Catalysts which may be used in the process of this invention include any of the well known catalysts of the prior art such as for eaxmple, siliceous catalysts including silica-alumina, platinum-alumina type catalysts used in reforming or hydroforming or the desulfurization reactions may be conducted in the presence of chromia-molybdenum-trioxide, nickel-molybdate supported on alumina, or nickel-tungsten-alumina or cobalt-molybdate-alumina and nickel-cobalt-molybdate catalysts. The catalytic material may be any suitable desulfurization catalyst including those which are hydrogenating catalysts, such that the sulfur impurities are either adsorbed by the catalyst and/or hydrogenated to produce hydrogen sulfide, which is evolved as a product of the process. The catalysts which may be used for this purpose are for example, platinum and/or palladium supported on alumina type catalysts, a group VI metal compound including, for example, the oxides and/or sulfides of the left hand elements thereof, specifically chromia and/or molybdenum trioxide supported on alumina; the group VI metal compounds may be promoted with a compound of a metal of group VIII such as the oxides and/or sulfides of iron, cobalt and nickel. Another suitable class of catalysts are the heteropoly acids which have molybdenum, chromium, vanadium and/or tungsten as the outer acid-forming element and phosphorus, silicon, germanium, platinum, etc., may be present as the central acid forming element. Examples of the heteropoly acids are phosphomolybdic acid, phosphotungstic acid, either alone or supported on a carrier material such as for example, silica-alumina.

The hydrocarbons to be desulfurized by the process of this invention include those referred to as straight-run hydrocarbons or hydrocarbon products of cracking operations which include gasoline, naphtha, kerosene, gas oil, cycle stocks from catalytic cracking or thermal cracking operations, residual oils, thermal and coker distillates, etc. These also include those special cuts of either straight run or catalytically cracked products which are referred to as cycle oil, stove oil, diesel fuels, etc. The sulfur concentration of these hydrocarbons may vary in the range of from about .03 to about 10 percent by weight. It is contemplated within the scope of this invention of treating hydrocarbon stocks having a gravity in the range of from about 20 to about 50 API and a sulfur concentration of from about 0.25 to about 6.0 percent by weight, such as for example, gas oil, light catalytically cracked cycle stock and diesel base stock. However, it should be understood, of course, that other feed stocks or any combinations thereof may be processed in accordance with this invention. In addition, it is contemplated that the boiling range of the hydrocarbon feed material to be desulfurized in the process of this invention may have an initial boiling point in the range of from about 70 to about 800° F., and an end point in the range of from about 250 to about 1050° F., at atmospheric pressure. The hydrocarbon feed materials employed in the process may be treated in the liquid, vapor or a mixed liquid-vapor state. In addition, contact of the hydrocarbon in the liquid state with the hydrogen-rich gas may be effected under either concurrent or countercurrent operating conditions.

As hereinbefore indicated, any one or both of the reactors of the improved process may be provided with a plurality of separate fixed catalyst beds within the reactor shell. The beds may contain substantially equal quantities of catalyst amounting to from about 10 percent to about 20 percent of the total mass of catalyst within the reactor or beds of varying quantities of catalyst may be employed in the reactor. By this arrangement, a particular feed material to be treated may be passed in contact with any preselected quantity or portion of the catalyst within the reactor under selected reaction conditions. It is also contemplated employing a reactor containing at least three separate catalyst beds with the two upper catalyst beds containing approximately equal quantities of catalyst in each bed and the lowermost bed containing a quantity of catalyst at least equal to the total quantity of catalyst in the remaining catalyst beds. In addition to the above, provision has been made to permit the injection of a quench material such as a gas or oil which may be a recycle gas or oil at incremental points or a point below about the first quarter of the catalyst bed. The quench provides a means of controlling excess heat of reaction liberated when processing, particularly, high sulfur-bearing and highly unsaturated feed stocks.

As hereinbefore indicated, a plurality of separate catalyst beds which may contain different quantities of catalyst in each catalyst bed may be employed in any one or both of the reactors. Generally the quantity of catalyst in each bed will be increased in the direction of flow of the reactant material through the reactor. The catalyst beds are retained as fixed catalyst beds, usually between suitable perforated grids or foraminous members, which will permit flow of reactant material and/or chemical reactant sequentially through the catalyst beds in the reactor.

In accordance with one embodiment of this invention a hydrocarbon reactant may be introduced between the catalyst beds for flow through only a selected portion of the catalyst within the reactor. With this arrangement, the hydrogen-rich gas will be passed continuously and sequentially through the total mass of catalyst in the reactor in order that vaporous hydrocarbons will not coke or contaminate the unused portion of the catalyst in the reactor. By this novel arrangement, different hydrocarbon reactant materials may be processed under different conditions of severity, including space velocities in the range of from about 1 to about 10 times the space velocity for the total catalyst inventory within the reactor. Furthermore, by the improved arrangement of process steps of this invention dissimilar reactant materials may be simultaneously contacted or treated in the separate reactors under varying severity conditions of operation. Moreover, this arrangement lends itself to a system of maximum flexibility and versatility for processing either similar or dissimilar hydrocarbon reactants, particularly for the desulfurization of sulfur-containing hydrocarbons.

As an example of a specific method of operating the improved process of this invention in accordance with one embodiment thereof, a hydrocarbon reactant material comprising a fluid catalytic cracking light cycle oil having an API gravity of about 27 API may be desulfurized at a space velocity of about 3.2 w./hr./w. to remove at least about 90 percent of its sulfur content by passing the cycle oil with hydrogen-rich gas through the total mass of catalyst in one reactor. In another reactor, a feed material having an API gravity of about 42 API, such as a stove oil, may be simultaneosuly and effectively desulfurized without color change by passing the material with hydrogen in contact with only a portion of the catalyst, say about ½ or less than ½ of the total mass while the hydrogen-rich stream is passed through the total catalyst mass. Accordingly, by operating in this manner the space velocity will be increased to at least twice that employed when using the total quantity of catalyst in the reactor. Furthermore, the dissimilar feed materials may be simultaneously treated under different conditions of severity to effect the desired desulfurization. When treating a high API gravity feed material an advantage is achieved during the desulfurization of the feed in that the process may be carried out at much higher space velocity conditions above about 6.0 w./hr./w. such that there is no degradation of the feed color. Accordingly, as hereinbefore stated, the space velocity may be controlled over a wide range by introducing the hydrocarbon reactant material such that it passes through only desired portions of the catalyst mass with the hydrogen-rich gas stream being passed through the total mass of catalyst in the reactors. When operating a process of this nature, the preferred method of operation is to employ the first reactor of the series to treat the hydrocarbon reactant material having the least amount of sulfur contaminant and the last reactor in the series for treating the hydrocarbon feed having the greatest or highest sulfur contamination.

One of the primary advantages of the improved process of this invention resides in the recovery of heat from the reactor effluent to provide efficient utilization of available heat with concomitant savings in utility expenses, as well as minimizing the use of costly alloy steels such as stainless steel surfaces in the system. Use of alloy surface in the reactor effluent heat exchange train or system has been minimized by splitting the reactor effluents such that a portion of the effluent is used to preheat the hydrocarbon feed in one heat exchanger while using the other portion of the effluent to heat the hydrogen-rich recycle gas in a second exchanger and provide preheat to the product effluent passed to the stripper. Additional advantages to the improved heat exchange system of this process will be more fully described hereinafter by specific reference to the drawing. However, it should be pointed out at this time that by heating the recycle gas to an elevated temperature of from about 570° F. to about 600° F. by indirect heat exchange with the reactor effluents reduces the need to further heat this stream in a separate furnace. This, therefore, eliminates the requirement for protecting the furnace tubes against hydrogen sulfide and hydrogen in the recycle stream whereby the tubes may be formed from a much less expensive material with consistent savings in investment.

In addition to the above, a vast important improvement in the process described herein resides in the recovery of liquid product by the use of a liquid condensate recovery separator in the reactor effluent system in cooperation with the low pressure steam stripper. In this embodiment two flash drums or liquid product separators are employed in the second reactor effluent system in a novel arrangement to provide the stripper feed at a desired elevated temperature of about 450° F. This is accomplished by passing the condensate from the low temperature flash drum comprising a minor portion of the liquid condensate in indirect heat exchange with the reactor effluent and thereafter combining this preheated stream with the major portion of the liquid condensate obtained from the high temperature separator. The combined condensate stream at the desired elevated temperature is then passed to the stripper. This improved sequence of separation steps greatly enhances the thermal efficiency of the process by eliminating the necessity for cooling the entire reactor effluent to a low temperature level of about 125° F. and then reheating the condensate to the desired stripping temperature level. Furthermore, the flash drum or separation drum employed between the first and second reactor of the series is maintained at a temperature which will minimize any carry over of feed treated in the first reactor and a sufficiently elevated pressure to exclude the necessity of recompressing the separated hydrogen-rich gas. By maintaining the separation drum between the reactors in the series at an elevated pressure above the pressure of the next reactor in the series and a temperature between about 300° F. and about 500° F., a hydrogen-rich gas stream is recovered which is substantially free of hydrocarbon products of the first reactor to prevent their contamination of the feed to the second reactor and the major portion of the hydrogen sulfide in the product effluent is retained in the liquid condensate phase with only a minor portion, less than about 0.5 percent by weight, being carried into the second reactor in the series. It has been found by the improved process of this invention that the quantity of hydrogen sulfide in the hydrogen-rich gas stream may be as high as 70.0 percent by weight without adversely effecting the desulfurization characteristics of the process and that it is not essential to employ a hydrogen-rich gas substantially free of hydrogen sulfide.

The liquid condensate product separated from each reactor effluent is passed to its own stripping tower at a temperature in the range of from about 300° F. to about 500° F. The steam strippers may be maintained at a temperature within the range of from about 225° F. to about 600° F. and a pressure of from about atmospheric up to about 100 p.s.i.g., which conditions are suitable for removing hydrogen sulfide from the treated hydrocarbon products and at the same time permits effective control of the boiling point of the product. By using steam as the stripping medium in the lower portion of the towers, the use of expensive alloy reboilers is also eliminated. Furthermore, the lower temperatures employed in the steam stripper also virtually eliminate the problem of degrading product color by extensive reheating.

Having thus generally described the improved method and process of this invention, reference is now had by way of example to the drawing which represents a preferred mode of operation.

As previously discussed, the improved arrangement of process steps of this invention is directed in one embodiment to the processing of dissimilar feed materials simultaneously. Accordingly, to simplify the discussion and to facilitate understanding of the improved sequence of process steps, the feed materials employed in the process will be referred to as feeds A. B and C, in the following discussion of the drawing.

Referring now to the drawing, a feed material A is passed by conduit 2 containing pump 4 in indirect heat exchange with hot products of reaction in heat exchanger 6 whereby the feed material is preheated to an elevated temperature of about 200° F. The thus preheated feed is passed by conduit 8 to heat exchanger 10 wherein additional heating of the feed material is accomplished by indirect heat exchange with a major portion, about 67 percent of the hot effluent product from the first reactor 18 of the series. The thus heated feed material A leaves heat exchanger 10 at a temperature of about 585° F. by conduit 12 and is passed to furnace 14. In furnace 14 feed A is heated to an elevated temperature of about 750° F., and then passed by conduit 16 to desulfurization reactor 18, which is the first of the series of reactors employed in the process. Hydrogen-rich gas which has been heated by indirect heat exchange means as hereinafter described to an elevated temperature of about 600° F. is admixed with the hot feed material A discharged from furnace 14 in an amount sufficient to maintain the hydrogen partial pressure in the reactor effluent stream at a value of at least about 250 p.s.i.g. In reactor 18, the temperature is maintained at about 700° F., and a pressure of about 960 p.s.i.g., wherein thee feed material A is desulfurized by passing through a single or a plurality of fixed beds of cobalt molybdenum catalyst. The product effluent from reactor 18 is removed by conduit 20 at an elevated temperature of about 720° F. The effluent stream in conduit 20 is divided into two streams, 22 and 24, with the major portion being passed by stream or conduit 22. The major portion of the hot effluent stream is passed to heat exchanger 10 for preheating the feed as previously discussed, and then passed by conduit 26 to the first separation drum between the reactors in the series of reactors. The remaining portion of the reactor effluent amounting to about 33 percent is passed by conduit 24 to heat exchanger 30 used to heat recycle hydrogen-rich gas, thereby cooling the product effluent to about 600° F. Thereafter, this minor portion of the product effluent stream is passed by conduit 32 to heat exchanger 34 to further cool this portion of the product effluent to about 400° F. The thus cooled product effluent is passed by conduit 36 and conduit 26 is about 350° F. The thus cooled product effluent is passed by conduit 36 and conduit 26 to separator 28. In order to heat the condensate separated in separator 28 to a temperature suitable for introduction into the stripper tower associated with reactor 18, the condensate having been reduced to a temperature of about 350° F. is passed by conduit 40 to heat exchanger 34 wherein the temperature of the condensate is raised to about 440° F. The thus heated condensate product is recovered from heat exchanger 34 and passed by conduit 42 to stripper tower 44. Stripper tower 44 is maintained at a pressure of about 25 p.s.i.g., employing a top temperature of about 270° F., and a bottom temperature of about 360° F. Steam is introduced to the bottom of the stripper tower 44 by conduit 46 at a temperature of about 450° F. to provide heat therein and strip hydrogen sulfide contaminants from the product with the high boiling portion of the desulfurized product being recovered from the bottom of the tower by conduit 48 at a temperature of about 360° F. The product recovered from the bottom of tower 44 by conduit 48 is passed to heat exchanger 6 wherein the fresh feed material is preheated by indirect heat exchange with the hot desulfurized product. The product is then removed and passed by conduit 50 to cooler 52 to further lower the temperature of the product to about 100° F., and then recovered by conduit 54. In stripper 44 an overhead product is withdrawn by conduit 56, passed to cooler 58 wherein the temperature is lowered to about 90° F., and the thus cooled overhead material is passed by conduit 60 to drum 62. Drum 62 is maintained at a temperature of about 90° F. and a pressure of about 15 p.s.i.g. for the recovery of a liquid condensate product from a gaseous product. The gaseous product containing stripped hydrogen sulfide is removed by conduit 64 and passed to suitable hydrogen sulfide recovery equipment such as an amine scrubber. The condensate recovered in drum 62 is removed by conduit 66 and a major portion of this condensate is passed as reflux to the upper portion of tower 44. The minor portion of the condensate is removed by conduit 68. Simultaneously with the processing of feed material A, as discussed above, a feed material B is introduced by conduit 70 containing pump 72 and passed to a heat exchanger 74 for preheating of the feed material with the product effluent recovered from the second stripper associated with the second reactor of the series. In indirect heat exchanger 74, feed material B is preheated to an elevated temperature of about 260° F. and passed by conduit 76 to heat exchanger 78 wherein it is further heated by indirect heat exchange with a portion of the second reactor product effluent, as more fully described herein. In heat exchanger 78, feed material B is increased to an elevated temperature of about 540° F. and passed by conduit 80 to furnace 82, to be heated to an elevated temperature of about 760° F., prior to being passed by conduit 84 containing valve 86 to reactor 88. For the purposes of this discussion, feed material B will be considered as passing through the total mass of catalyst in reactor 88 and accordingly feed material B, which is heated in the furnace 82, will pass by conduit 84 through valve 86 to the top of the reactor 88 for flow downwardly therethrough in contact with a cobalt molybdenum catalyst maintained in a plurality of separate fixed catalyst beds within the reactor. Hydrogen-rich gas preheated to an elevated temperature of about 570° F. is admixed with the feed material B after the feed material has been heated in the furnace and prior to introduction of the heated feed material B to reactor 88. In reactor 88 the temperature is maintained at an elevated temperature of about 700° F. and a pressure of about 900 p.s.i.g. Under these conditions of operation, feed material B is desulfurized in the presence of the cobalt molybdenum catalyst therein. Depending upon the feed material being treated in the reactor and the degree of desulfurization required therein, the hydrogen admixed with the feed will be such as to maintain the hydrogen partial pressure at the reactor outlet of at least about 250 p.s.i.g. In other words, sufficient hydrogen will be introduced with the particular feed material being treated in reactor 88 to supply that required for removal of sulfur compounds in the feed and to maintain the desired hydrogen partial pressure in the reactor effluent. The effluent from reactor 88 at an elevated temperature of about 720° F. is removed by conduit 90 and split into two streams 92 and 94 having valves 96 and 98 respectively. The product effluent stream comprising desulfurized hydrocarbon, hydrogen-rich gas and hydrogen sulfide is split into two portions. One portion of the product effluent stream is passed by conduit 94 to heat exchanger 100 to reduce the temperature of this portion of the stream to about 590° F. by being passed in indirect heat exchange with a relatively cool hydrogen-rich gas stream passed to reactor 88. The thus cooled stream is then passed by conduit 102 to heat exchanger 104 for indirect heat exchange with product condensate to further reduce the temperature of the stream to about 450° F. The thus cooled stream is then passed by conduit 106 to separation drum 108. The remaining portion of the product effluent stream in conduit 92 is passed to heat exchanger 78 whereby this portion of the effluent stream is reduced to a temperature of about 450° F. Thereafter the cooled effluent stream is passed from heat exchanger 78 by conduit 110 for admixture with the remaining portion of the cooled product effluent in conduit 106. Separation drum 108 is maintained at an elevated pressure of about 867 p.s.i.g., and an elevated temperature of about 450° F., whereby the major portion of the liquid product is condensed and separated from a gaseous product stream. The gaseous product stream is removed from separation drum 108 by conduit 112 and passed to heat exchanger 114 in indirect heat exchange with cool hydrogen-rich gas thereby reducing the temperature of the gaseous stream from separation drum 108 to a temperature of about 332° F. This cooled gaseous stream is passed by conduit 116 to cooler 118 for further cooling. The thus cooled gaseous stream is passed by conduit 120 to a second separation drum 122 maintained at a temperature of about 125° F. and a pressure of about 850 p.s.i.g. In separation drum 122 a second condensate stream is recovered from a hydrogen-rich gaseous stream. The hydrogen-rich gaseous stream is removed from the separation drum and passed to suitable equipment for the separation of hydrogen sulfide from the hydrogen-rich recycle stream. The liquid condensate is removed from separation drum 122 by conduit 124 at a temperature of about 125° F. and passed to heat exchanger 104 wherein the temperature of this condensate stream is raised to about 405° F. Thereafter the condensate stream is recovered from heat exchanger 104 and passed by conduit 126 to stripping tower 128 employed for stripping the condensate product of the second reactor 88 of the series of reactors. The liquid condensate product separated in separation drum 108 at an elevated temperature of about 450° F. is removed therefrom and passed by conduit 128 for admixture with the condensate stream in conduit 126 prior to entering the stripping tower 128. By this novel and improved arrangement of separation steps the major portion of the liquid condensate product of reactor 88 is separated at an elevated temperature sufficiently high for introduction into the stripping tower without requiring any additional preheat. The minor portion of the liquid condensate recovered from the second separation drum of the series may be sufficiently heated by being passed in indirect heat exchange with hot reactor effluent such that the stream after this heat exchange step may be admixed with the major portion of the liquid condensate separated at an elevated temperature to provide a combined stream at an elevated temperature of about 435° F. and suitable for introduction into the stripping tower. Stripping tower 128 is maintained at a pressure of about 30 p.s.i.g. having a temperature in the upper portion of the tower of about 280° F. and a temperature in the lower portion thereof maintained at about 360° F. The stripping tower 128 may be larger or smaller than tower 44 but is usually the same size as stripping tower 44. Steam is employed in the lower portion of the tower for supplying heat to the tower as well as stripping hydrogen sulfide from the condensate product. Product material is removed from the bottom of tower 128 by conduit 130 and passed to indirect heat exchanger 74 to preheat feed material B, previously described, thereby lowering the temperature of this product stream. The product is then passed by conduit 132 to cooler 134 to further reduce the temperature of the condensate stream to about 100° F. The thus cooled condensate stream is recovered by conduit 136 for further use as desired. A gaseous stream is removed from the upper portion of stripper tower 128 by conduit 138, passed to cooler 140 wherein the temperature is reduced to about 90° F. and then passed by conduit 142 to drum 144. Drum 144 is maintained at a temperature of about 90° F. and a pressure of about 15 p.s.i.g. A condensate is recovered from the lower portion of drum 144 by conduit 146. A portion of this stream is passed to the upper portion of stripper tower 128 as reflux with the remaining portion being withdrawn by conduit 148 for further use as desired depending upon the type of material treated in this phase of the process. A gaseous stream is removed from separator drum 144 by conduit 150 and passed to suitable recover equipment.

One of the important aspects of the improved process of this invention resides in the sequence of steps for handling the hydrogen-rich gas stream employed in the process. As hereinbefore discussed, the process employs substantially a constant volume of hydrogen-rich gas which is cyclically circulated in the process in a manner to permit flow of this gas stream in series through the reactors with sufficient make-up hydrogen added to the constant volume of cyclically circulated gas stream prior to entering each reactor to maintain the hydrogen partial pressure in the reactor outlet of at least about 250 p.s.i.g. Accordingly then, to more clearly describe this aspect of the invention, reference is had to the drawing and specifically to separator drum 122 wherein a hydrogen-rich gas stream is recovered after passing through the series of reactors in the process. In separator drum 122 the hydrogen-rich gas containing hydrogen sulfide is withdrawn by conduit 160 and passed to suitable recovery equipment such as an amine absorber tower 162 for the separation of the major portion of the hydrogen sulfide from the remaining hydrogen-rich gas stream. Generally the hydrogen-rich gas recovered for recycle in the process will contain about 10.0 mole percent hydrogen sulfide and it may be as high as 25.0 mole percent. A hydrogen-rich gas is recovered from the absorber 162 at an elevated pressure of about 845 p.s.i.g. and passed by conduit 164 to compressor 166 wherein the hydrogen-rich gas is compressed to an elevated pressure of about 1000 p.s.i.g.

Prior to the introduction of the hydrogen-rich gas to compressor 166 sufficient make-up hydrogen is added by conduit 168 to supply the hydrogen requirements of the first reactor in the series, as well as to maintain the hydrogen partial pressure at the reactor discharge as hereinbefore discussed. The hydrogen-rich gas at the desired pressure is then passed by conduit 168 to heat exchanger 114 for indirect heat exchange with the hot gaseous product separated from drum 108, thereby raising the temperature of the compressed hydrogen-rich gas to about 400° F. The thus preheated and compressed hydrogen-rich gas is then passed by conduit 170 to heat exchanger 30 in the minor effluent stream separated from reactor 18. In heat exchanger 30, the compressed hydrogen-rich gas is further heated to an elevated temperature of about 600° F. which is sufficiently elevated to then pass the hydrogen-rich gas directly to the reactor or for admixture with the feed material passed to the reactor from furnace 14. In one embodiment, the preheated hydrogen-rich gas from heat exchanger 30 is passed directly by conduit 172 to conduit 16 for admixture with the feed as previously discussed. In separator drum 28 a hydrogen-rich gas stream is recovered from the product effluent at an elevated pressure sufficiently high to be passed directly to the second reactor of the series without further compression. This hydrogen-rich gas stream is recovered from separator 28 and passed by conduit 174 to heat exchanger 100, which is employed to preheat this recovered hydrogen-rich gas stream to an elevated temperature of about 570° F. Make-up hydrogen is introduced by conduit 176 to the hydrogen-rich gas in conduit 174 prior to passing the hydrogen-rich gas stream to heat exchanger 100. That is, no additional heating facilities other than exchanger 100 are required to supply the heat requirements of this stream. In any event, the hydrogen-rich gas at an elevated temperature of about 570° F. is then passed by conduit 178 to the inlet of reactor 88. When processing a feed material which passes through the total mass of catalyst in reactor 88 the hydrogen-rich gas stream will be mixed with the hot feed material prior to entering the reactor. However, as hereinbefore discussed, it is contemplated treating feed material C which will pass through only a portion of the catalyst in the reactor 88. When so treating a feed material C the hydrogen-rich gas will be passed to the inlet of the reactor and pass through the total mass of catalyst while the hydrocarbon feed C preheated in furnace 82 will bypass a portion of the mass of catalyst in the reactor by flowing through conduit 180 when closing valve 86. It is to be specifically noted that the hydrogen-rich stream is always passed through the total mass of catalyst in the reactor, whereas the hydrocarbon feed may pass either through a portion or all of the catalyst mass in the reactor. In any event, the product effluent of the reactor 88 containing hydrogen-rich gaseous material is passed to the separation drum 108 wherein the hydrogen-rich gas stream is separated from the condensate product and passed to the second separator drum 122 by conduits 112, 116 and 120, as hereinbefore discussed, thus completing the cyclic circulation of the hydrogen-rich gaseous stream. It can be seen by the above specific discussion that not only can dissimilar feed materials be treated under desired conditions, but that the improved sequence of steps minimizes compressor requirements, provides as improved method for the recovery of product condensate and minimizes the hydrogen inventory of the process.

Table I below presents the results obtained when treating a light cycle oil obtained from fluid catalytic cracking in accordance with this invention.

Table II below presents the results obtained when treating for example a stove oil in accordance with this invention.

Table III below describes a light cycle oil and a stove oil which may be employed as feeds in the process of this invention.

TABLE I

Material Balances
MATERIAL BALANCE FCC LIGHT CYCLE OIL FEED

|  | Feed | | Gas | Products | |
|---|---|---|---|---|---|
|  | Cycle oil | Feed gas | | Gasoline | Prod. oil |
| Vol. percent on feed | 100.0 | | | 5.0 | 95.0 |
| BPSD | 8,000 | | | 400 | 7,950 |
| °API | 27.0 | | | 37.8 | 28.5 |
| Lb./gal | 7.43 | | | 6.96 | 7.36 |
| GPH | 14,000 | | | 700 | 13,260 |
| Lb./hr | 104,000 | 3,080 | 4,594 | 4,877 | 97,609 |
| Sulfur, weight percent | 2.0 | | | .02 | 0.2 |
| Sulfur, lb./hr | 2,080 | | 1,921 | 1 | 158 |
| SCFB | | 400 | 168 | | |

TABLE II

Material Balance Stove Oil Feed

|  | Feed | | Gas | Products | |
|---|---|---|---|---|---|
|  | Stove oil | Feed gas | | Gasoline | Prod. oil |
| Vol. percent on feed | 100.0 | | | 3.0 | 96.9 |
| BPSD | 8,000 | | | 258 | 7,750 |
| °API | 42.0 | | | 50.0 | 43.0 |
| Lb./gal | 6.79 | | | 6.49 | 6.75 |
| GPH | 14,000 | | | 451 | 13,550 |
| Lb./hr | 95,000 | 1,269 | 1,836 | 2,927 | 91,506 |
| Sulfur, weight percent | 0.8 | | | .02 | .07 |
| Sulfur, lb./hr | 760 | | 698 | 1 | 61 |
| SCFB | | 165 | 90 | | |

TABLE III

Charge Stocks

|  | Stove oil | Diesel base | FCC light cycle oil |
|---|---|---|---|
| Gravity, °API | 42.0 | 34.0 | 27.0 |
| Color, ASTM | 25 | 16 |  |
| Flash, °F | 125–150 | 140–200 | 140–200 |
| Sulfur, weight, percent | 0.8 | 1.5 | 2.0 |
| ASTM distillation, °F.: |  |  |  |
| I.B.P | 360 | 374 | 350 |
| 10% | 390 | 520 | 405 |
| 50% | 440 | 570 | 482 |
| 90% | 510 | 600 | 588 |
| F.B.P | 540 | 620 | 615 |

Having thus described our invention and presented specific working examples thereof, it is to be understood that various modifications may be made thereto without departing from the spirit and scope thereof.

We claim:

1. A method for desulfurizing dissimilar hydrocarbon feed materials which comprises maintaining a plurality of separate desulfurization zones for parallel flow of hydrocarbon feed material therethrough, each of said desulfurization zones being provided with its own stripping zone for the separate recovery of desired low and high boiling desulfurized hydrocarbon products, maintaining a constant volume of hydrogen-rich gases passed serially through said plurality of separate desulfurization zones and recycle from the last desulfurization zone in the series to the first desulfurization zone in the series by passing sufficient additional hydrogen-rich gas to each desulfurization zone in the series to provide the net hydrogen consumption requirements of each zone, recovering desulfurized hydrocarbon product material from hydrogen-rich gaseous material between each desulfurization zone in the series and heating the recovered desulfurized hydrocarbon product recovered from each zone to a sufficiently elevated temperature for passage to the stripping zone associated with each desulfurization zone by passing the recovered desulfurized hydrocarbon product in indirect heat exchange with product effluent removed from a desulfurization zone.

2. In a process for desulfurizing dissimilar hydrocarbon feed materials in a plurality of desulfurization zones arranged for parallel flow of hydrocarbon feed material and series flow of hydrogen-rich gaseous material the improved method of operation which comprises passing a constant volume of hydrogen-rich gaseous material sequentially through a series of separate desulfurization zones maintained at reduced pressure in the direction of flow sufficient to provide flow of said hydrogen-rich gaseous material through said series of zones, adding additional hydrogen-containing gas to the hydrogen-rich gaseous material passed to each zone sufficient to provide the hydrogen consumption requirements of each zone and maintaining the hydrogen partial pressure of the gaseous material discharged from each zone at a desired predetermined level, separately recovering desulfurized hydrocarbon product from hydrogen-rich gases discharged from each zone, passing the recovered desulfurized hydrocarbon recovered separately from each zone to separate stripping zones associated with each desulfurization zone for the recovery of desired low and high boiling desulfurized hydrocarbon products, recovering a hydrogen-rich gaseous material from the last desulfurization zone of the series and passing the thus recovered hydrogen-rich gaseous material through a treating zone for the removal of undesired constituents therefrom and thereafter passing the treated hydrogen-rich gaseous material at an elevated pressure sequentially in indirect heat exchange with a portion of the product effluent recovered from each desulfurization zone in the series to heat the hydrogen-rich gaseous material to an elevated temperature sufficient for direct passage to the first desulfurization zone in the series.

3. A method for separately desulfurizing a plurality of sulfur-bearing hydrocarbon feed streams which comprises maintaining a plurality of separate desulfurization zones containing a suitable desulfurization catalyst at desired elevated temperatures and pressures and in parallel flow arrangement with respect to the flow of hydrocarbon feed material therethrough, continuously cyclically circulating a constant volume of hydrogen-rich gaseous material in series through said plurality of desulfurization zones, maintaining the series of desulfurization zones with respect to the flow of the hydrogen-rich gaseous stream at a decreasing pressure in the direction of flow, adding make-up hydrogen to the constant volume of cyclically circulated hydrogen-rich gaseous stream passed to each zone sufficient to provide the net hydrogen consumption within each zone and providing heat to the hydrogen-rich gases passed to each zone in the series by passing the hydrogen-rich gases in indirect heat exchange with a major portion of the product effluent recovered from the desulfurization zone to which the thus heated hydrogen-rich gaseous stream is to be passed.

4. A process for desulfurizing sulfur-bearing hydrocarbon feed materials of different boiling range in a plurality of desulfurization zones arranged for parallel flow of hydrocarbon feed material therethrough and series flow of a hydrogen-rich gaseous material therethrough, the improved method of operation which comprises maintaining a constant volume of hydrogen-rich gaseous material for series flow through said plurality of desulfurization zones and recycle from the last zone of the series to the first series of zones and at an elevated temperature and of reduced pressure in the direction of flow from the first to the last zone of the series, introducing make-up hydrogen to the constant volume of hydrogen-rich gaseous material passed to each zone sufficient to maintain the hydrogen partial pressure of the gaseous material discharged from each zone at least about 240 p.s.i.a., and heating the total hydrogen-rich gaseous material prior to being passed to each desulfurization zone in the series by passing the hydrogen-rich gaseous material in indirect heat exchange with a major portion of the product effluent recovered from the zone to which the thus heated hydrogen-rich gaseous material is to be passed.

References Cited in the file of this patent

UNITED STATES PATENTS

| | | |
|---|---|---|
| 2,143,078 | Lyman et al. | Jan. 10, 1939 |
| 2,763,358 | Linn et al. | Sept. 18, 1956 |
| 2,773,013 | Wolf et al. | Dec. 4, 1956 |
| 2,833,698 | Patton et al. | May 6, 1958 |
| 2,883,337 | Hartley et al. | Apr. 21, 1959 |